(12) United States Patent
Sugimoto

(10) Patent No.: US 12,583,100 B2
(45) Date of Patent: Mar. 24, 2026

(54) ROBOT TO WHICH DIRECT TEACHING IS APPLIED

(71) Applicant: DENSO WAVE INCORPORATED, Chita-gun (JP)

(72) Inventor: Wataru Sugimoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 240 days.

(21) Appl. No.: 17/977,578

(22) Filed: Oct. 31, 2022

(65) Prior Publication Data

US 2023/0139523 A1    May 4, 2023

(30) Foreign Application Priority Data

Oct. 29, 2021    (JP) ................................. 2021-178187

(51) Int. Cl.
*B25J 9/00*        (2006.01)

(52) U.S. Cl.
CPC .......... *B25J 9/0081* (2013.01); *B25J 9/0009* (2013.01)

(58) Field of Classification Search
CPC ......... B25J 9/0081; B25J 9/0009; B25J 18/00
See application file for complete search history.

(56) References Cited

U.S. PATENT DOCUMENTS

| | | | |
|---|---|---|---|
| 2018/0354141 A1* | 12/2018 | Haddadin | .............. B25J 9/0081 |
| 2019/0099898 A1 | 4/2019 | Sato et al. | |
| 2020/0108511 A1* | 4/2020 | Inoue | ........................ B25J 19/02 |
| 2020/0271627 A1* | 8/2020 | Battenberg | ............. B25J 9/1666 |
| 2020/0298396 A1* | 9/2020 | Yoshimi | ...................... B25J 9/12 |
| 2021/0157091 A1 | 5/2021 | Yamazaki et al. | |
| 2021/0370498 A1* | 12/2021 | Kudo | ..................... B25J 15/045 |

FOREIGN PATENT DOCUMENTS

| | | |
|---|---|---|
| DE | 10 2015 012 961 A1 | 4/2017 |
| DE | 10 2019 125 942 A1 | 5/2020 |
| DE | 10 2020 103 269 A1 | 8/2021 |
| DE | 10 2021 113 481 A1 | 12/2021 |
| EP | 3 147 752 A1 | 3/2017 |
| EP | 3 699 585 A2 | 8/2020 |
| JP | S60-14876 U | 1/1985 |
| JP | 2014-184537 A | 10/2014 |
| JP | 2018-122428 A | 8/2018 |

* cited by examiner

*Primary Examiner* — Sihar A Karwan
(74) *Attorney, Agent, or Firm* — Oliff PLC

(57)        ABSTRACT

A robot is provided, for example, as an industrial robot having a plurality of arms every mutually adjacent two of which are rotatably connected by an axis. The arms include a leading arm having a cylindrical outer surface. An anti-slip structure is formed on and around the cylindrical outer surface in a circumferential direction thereof. The anti-slip structure serves as a slip-resistance structure, that is, a surface structure for preventing or reducing a user's hand from slipping off therefrom.

11 Claims, 6 Drawing Sheets

FIG.9

ROBOT TO WHICH DIRECT TEACHING IS APPLIED

CROSS-REFERENCE TO RELATED APPLICATION

This application is based on and claims the benefit of priority from earlier Japanese Patent Application No. 2021-178187 filed Oct. 29, 2021, the description of which is incorporated herein by reference.

BACKGROUND

Technical Field

The present invention relates to an industrial robot to which direct teaching is applied by the user.

Related Art

Currently, there are known examples of industrial robots to which the user performs direct teaching on the robot (refer to Patent Document 1). In this example, in an industrial 6-axis robot equipped with the first to sixth arms, a technique is disclosed in which the user holds or grasps the sixth arm (i.e., the leading arm among the six arms) and moves the arm portion of the robot, i.e., the manipulator portion, to perform direct teaching.

PATENT DOCUMENTS

[Patent Document 1] JP-2020-151807 A

Problems to be Solved

By the way, the inventor noticed that when the user grasps the leading arm and moves the robot, it is difficult to move the leading arm accurately. If the user cannot move the leading arm accurately in direct teaching, the teaching itself may be inaccurate, or fine-tuning of the leading arm position by another method may be necessary after the direct teaching, and teaching efficiency may necessarily be significantly reduced.

SUMMARY

The present disclosure is provided to solve the above problem, and the main objective is to make it easier for the user to move the leading arm accurately in robots where direct teaching is performed.

A first exemplary embodiment is provided to solve the foregoing drawbacks. The first exemplary embodiment relates to a robot, which is an articulated industrial robot, for example, and the robot including axes; and a plurality of arms every mutually adjacent two of which are rotatably connected by an assigned one of the axes, the arms including a leading arm. The leading arm has a cylindrical outer surface, an anti-slip structure being formed on and around the cylindrical outer surface in a circumferential direction thereof. The anti-slip structure serves as a slip-resistance structure which is a surface structure for preventing or reducing a user's hand from slipping off therefrom.

In this configuration, it is intended that the term "cylindrical" of the phrase "cylindrical outer surface" means a substantially cylindrical and has no angular portion thereon. Thus, the phrase "cylindrical outer surface" includes, for example, an outer surface which is smooth, but i) diameters of the arm change at respective positions in the axial direction thereof, ii) the shape of a section perpendicularly cut at a position in the axial direction is not truly circular but is non-circular without forming angular or projected portions.

According to the above configuration, the robot has multiple arms connected to each other and direct teaching is performed.

Here, the leading arm of the plurality of arms has a cylindrical outer surface. This reduces the damage to the user in the event of contact between the leading arm and the user. On the other hand, when the leading arm has a cylindrical outer surface, the hand easily slips and the leading arm must be gripped with a watchful eye when the user grasps and moves the leading arm in direct teaching, and the inventor noted that it is difficult for the user to move the leading arm accurately.

In this regard, an anti-slip structure, which resists to slipping which may occur during operations in the direct teaching of the robot, is provided as a predetermined structure provided along the circumferential direction on the outer surface of the cylindrical shape. Therefore, the anti-slip structure prevents the hand from slipping when moving the leading arm, and also facilitates transmission of force in the direction to rotate the leading arm. Furthermore, in direct teaching, the user can confirm by feel at any point in the circumferential direction that he or she is grasping a portion of the anti-slip structure without having to gaze at the leading arm. This allows direct teaching to be executed while looking at the hand (tool) or workpiece attached to the leading arm. Thus, it is easier for the user to move the leading arm accurately, and teaching can be performed accurately without having to fine-tune the leading arm position by another method after direct teaching. As a result, the remarkable effect of greatly improving the efficiency of teaching can be achieved.

A second exemplary embodiment defines the anti-slip structure such that, in the first exemplary embodiment, the anti-slip structure is an unevenness of a predetermined pattern being formed on and at least partly around the cylindrical outer surface in a circumferential direction thereof.

According to the above configuration, the cylindrical outer surface is provided with a predetermined pattern of irregularities along the circumferential direction as a predetermined structure. Therefore, the unevenness of the predetermined pattern prevents the hand from slipping when moving the leading arm, and also makes it easier to transmit the force in the direction to rotate the leading arm. Furthermore, in direct teaching, the user can confirm by feel at any position in the circumferential direction that he or she is grasping the uneven part of the predetermined pattern without having to gaze at the leading arm. This allows direct teaching to be executed while looking at the hand (tool) or workpiece attached to the leading arm. Thus, it is easier for the user to move the leading arm accurately, and teaching can be performed accurately without having to fine-tune the leading arm position by another method after direct teaching. As a result, the remarkable effect of greatly improving the efficiency of teaching can be achieved.

A third exemplary embodiment relates to a robot (which is for example an articulated industrial robot), including axes; and a plurality of arms mutually adjacent two of which are rotatably connected by an assigned one of the axes, the arms including a leading arm. The leading arm has a cylindrical outer surface, the cylindrical outer surface including a first part having a predetermined roughness level and a second part functioning as an anti-slip structure, having a roundness larger than the predetermined roughness, and being formed in a circumferential direction of the leading arm.

According to the above configuration, the cylindrical outer surface includes a first portion of predetermined roughness and a second portion as a predetermined structure that is rougher than the predetermined roughness and along the circumferential direction. Therefore, the second portion prevents the hand from slipping when moving the leading arm, and also facilitates transmission of the force in the direction to rotate the leading arm. Furthermore, in direct teaching, the user can confirm by feel at any point in the circumferential direction that he or she is grasping the second part without having to gaze at the leading arm. This allows direct teaching to be executed while looking at the hand (tool) or workpiece attached to the leading arm. Thus, it is easier for the user to move the leading arm accurately, and teaching can be performed accurately without having to fine-tune the leading arm position by another method after direct teaching. As a result, the remarkable effect of greatly improving the efficiency of teaching can be achieved.

Generally, an end effector (tool) is attached to the leading edge of the leading arm (the part opposite the adjacent arm). Therefore, if a user grasps near the tip of the leading arm, there is a risk of accidental contact with the end effector.

In this regard, as one example, the predetermined structure is provided is provided at an end of the leading arm on the side closest to the operator among the plurality of arms. According to such a configuration, the user will hold or grasp an end of the leading arm which is adjacent to the leading arm, thereby constraining the user from grasping near the tip of the leading arm.

As another example, at least one of the cable and pipe connections is provided on the cylindrical outer surface, and the predetermined structure is provided on the leading arm, only near an end thereof nearest the adjacent arm, among the plurality of arms, such the end being rather than a surface part on which the cable connector and the pipe connector are provided.

According to the above configuration, at least one of a cable connector and a pipe connection is provided on the cylindrical outer surface. This allows cables to be connected to the cable connector section and pipes (tubes, pipes, etc.) to the tube connector section. On the other hand, in that case, the user may accidentally contact the cable or pipe.

In this regard, the predetermined structure is provided in the leading arm only on the adjacent arm side of the plurality of arms, rather than the cable connector and the pipe connection. This allows the user to grasp the adjacent arm side in the leading arm rather than the cable connector and the tube connector, thereby preventing accidental contact with the cable or tube. Therefore, it is possible to prevent cables and tubes from being disconnected from the cable connector and the tube connector, or cables and tubes from being cut.

According to yet another example, the predetermined structure is provided over the entire circumference of the cylindrical outer surface. Such a configuration prevents the hand from slipping in direct teaching, regardless of the circumferential position of the user's grip on the leading arm. Furthermore, regardless of the circumferential position of the user's grasp of the leading arm, the user can confirm by feel that he or she is grasping a predetermined structural part.

According to yet another example, the predetermined structure is a knurled section where the cylindrical outer surface is knurled. According to this configuration, a predetermined structure can be easily and inexpensively installed simply by machining an existing component that constitutes the leading arm. Furthermore, compared to a structure with an anti-slip material or the like affixed to the cylindrical outer surface of the leading arm, for example, there is no risk of anti-slip members, etc. peeling off, and no risk of dust generation due to deterioration or wear of anti-slip members, etc.

BRIEF DESCRIPTION OF THE DRAWINGS

In the accompanying drawings:

FIG. 9 is a side view outlining the configuration of a collaborative robot which is according to a modification of the robot,

DETAILED DESCRIPTION OF THE PREFERRED EMBODIMENTS

The following is a description, with reference to the drawings, of one embodiment of a robot that is collaborative with humans, a field of industrial robots that has been in the spotlight in recent years.

Figure 1:
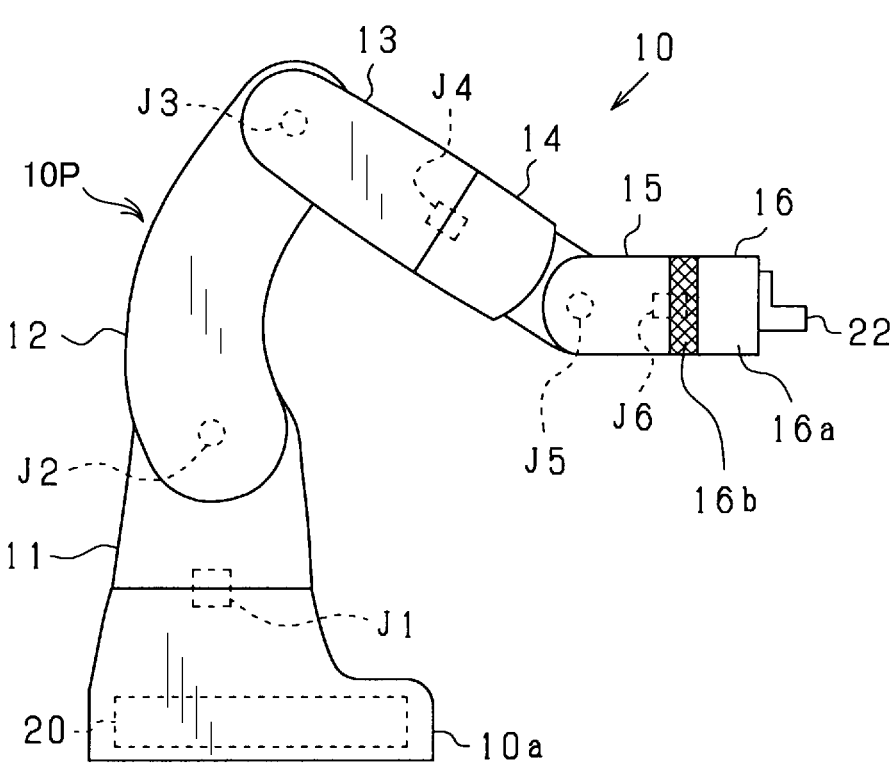
FIG. 1 is a side view outlining the configuration of a collaborative robot which is categorized in industrial robots, which is according to an embodiment.

As shown in FIG. 1, a robot 10 working with humans is a vertically articulated industrial robot (which is also called "6-axis robot") equipped with a plurality of arms (i.e., manipulator) 10P with multiple arms rotatably connected to each other via axes. The robot 10 incorporates a control unit 20 that is responsible for its overall control. The robot 10 is small and light enough to be carried by one person, for example. The robot 10 is designed to work with people, for example, so that safety fences are not needed in its operating conditions.

The control unit 20 is not limited to those built into the robot 10, but may be external to the robot 10. In this case, the robot 10 and the control unit 20 are configured to communicate with each other by wired or wireless means. The control unit 20 may be connected to other external devices such as teaching pendants, personal computers, smart phones (portable terminals), and other devices that can communicate with each other by wired or wireless means.

The robot 10 has a base 10a, six (or more) arms 11-16, and a hand 22. The base 10a may or may not be fixed to the installation surface. Each arm 11-16 and hand 22 are installed on the base 10a in such a way that arms 11-16 can be rotated via mutual axes in that order and constitute the robot arms (manipulator) 10P. Specifically, from the base 10a side, the first arm 11, second arm 12, third arm 13, fourth arm 14, fifth arm 15 (adjacent arm to the six arm), and sixth arm 16 (the leading arm) are connected. If each arm 11-16 is not identified, each arm 11-16 is referred to collectively as simply an arm. Each arm 11-16 is cylindrical in shape and has a cylindrical outer surface 16S. This reduces the damage to the user in the event of contact between each arm 11-16 and the user. The sixth arm 16 has a cylindrical outer surface 16S and made of metal, for example.

In relation to the sixth arm 16, which serves as a leading arm which will be held or grasped mainly by a user' hand (operator' hand) when direct teaching is performed with the robot 10, directions can be defined as illustrated in FIG. 1. The sixth arm 16 has a center line O passing through an axis J6 (later described), and hence, an axis direction AX can be defined as a direction along the center line O and a circumferential direction CR can be defined as a direction going around the center line O.

Especially, the cylindrical outer surface 16S of the sixth arm has a special meaning which can be explained as follows. In the present embodiment, it is intended that the term "cylindrical" of the phrase "cylindrical outer surface" of the sixth arm 16 means a substantially cylindrical and has no angular or projected portion thereon. Thus, the phrase "cylindrical outer surface" incudes, for example, an outer surface which is smooth, but i) diameters of the arm change at respective positions in the axial direction AX thereof, ii) the shape of a section perpendicularly cut at a position in the axial direction AX is not truly circular but non-circular without forming angular or projected portions.

A hand 22 (the end effector) is attached to the tip of the sixth arm 16 (opposite the adjacent fifth arm 15). In this case, the base 10a side is the base side of each arm 11-16, and the hand 22 side is the tip side of each arm 11-16. The hand 22 is, for example, a chuck or gripper, and other suction hands can also be employed, and can be selected as appropriate for the use of the robot 10.

Arms 11-16 of the manipulators 10P are rotatably connected via a plurality of axes J1-J6, respectively. In this case, in order from the base 10a side, the first axis J1, second axis J2, third axis J3, fourth axis J4, fifth axis J5, and sixth axis J6. If each axis J1-J6 is not specified, each axis J1-J6 is collectively referred to simply as axis J.

The first axis J1 is a vertical axis of rotation and connects the first arm 11 to the base 10a in a horizontal direction. The second axis 32 is a horizontal axis of rotation and connects the second arm 12 to the first arm 11 in a vertical direction. The third axis J3 is a rotary axis extending horizontally and connects the third arm 13 to the second arm 12 in a vertical direction. The fourth axis J4 is a rotary axis extending in the longitudinal direction of the third arm 13 and connects the fourth arm 14 to the third arm 13 in a rotatable manner. The fifth axis J5 is a rotary axis extending horizontally and connects the fifth arm 15 to the fourth arm 14 in a vertical direction. The sixth axis J6 is a rotary axis extending in the longitudinal direction of the fifth arm 15 and connects the sixth arm 16 to the fifth arm 15 in a rotatable manner.

The plurality of arms (i.e., manipulator) 10P of the robot 10 are equipped with six (i.e., two or more) motors (not shown) that drive axes J1-J6 respectively. Each motor has a mechanical or electrical braking function. Each motor operates a brake, which constrains each axis J1-J6 corresponding to each motor, thereby regulating (prohibiting) the rotational motion of each arm 11-16 interconnected via each axis J1-J6. The state in which the brake is operating in each motor is referred to as the state in which each axis J1-J6 is constrained. The state in which the brake is not operating (the brake is released) in each motor is referred to as the state in which the operation of each axis J1-J6 is not constrained (the operation of each axis J1-J6 is unconstrained).

The control unit 20, not shown in the figure, is mainly composed of a microcomputer equipped with, for example, a CPU, ROM, RAM, a rewritable memory device, and an input/output interface. The control unit 20 controls the operation of the entire robot 10. The memory device stores a robot control program for driving and controlling the robot 10. The control unit 20 then controls the operation of the robot 10 by executing the robot control program by the CPU. Each motor is electrically connected to the control unit 20. The control unit 20 controls the drive state of each motor based on the detection results of rotational position sensors and other sensors that detect the rotational position of each motor.

Although the figures are omitted, for example, the robot 10 is equipped with a start button to instruct the start of direct teaching, a release button to release the constraint of each axis, and an end button to instruct the end of direct teaching. When the start button is pressed by the user, the control unit 20 starts recording the teaching details such as the travel path, travel speed, or position of each arm 11-16. The control unit 20 releases the constraint of all axes J1-J6 only while the release button is pressed. The control unit 20 then finishes recording the teaching content when the end button is pressed. A button equivalent to the release button may be provided on a teaching pendant or similar device. The teaching pendant or other device may be used to select the axes to be operated or to set the constraint conditions for each axis J1-J6.

where the constraint of axes J1-J6 is released, the control unit 20 performs gravity compensation by controlling each motor so that each arm 11-16 connected to the unconstrained axes J1-J6 does not move due to the dead weight of each arm 11-16. In this case, each motor generates a torque weak enough to counteract the torque acting on each motor due to the dead weight of each arm 11-16. Therefore, the user can move any of the arms 11-16 with light force without feeling the weight of the arms 11-16, even when the constraint of axes 31-36 is released.

Figure 2:
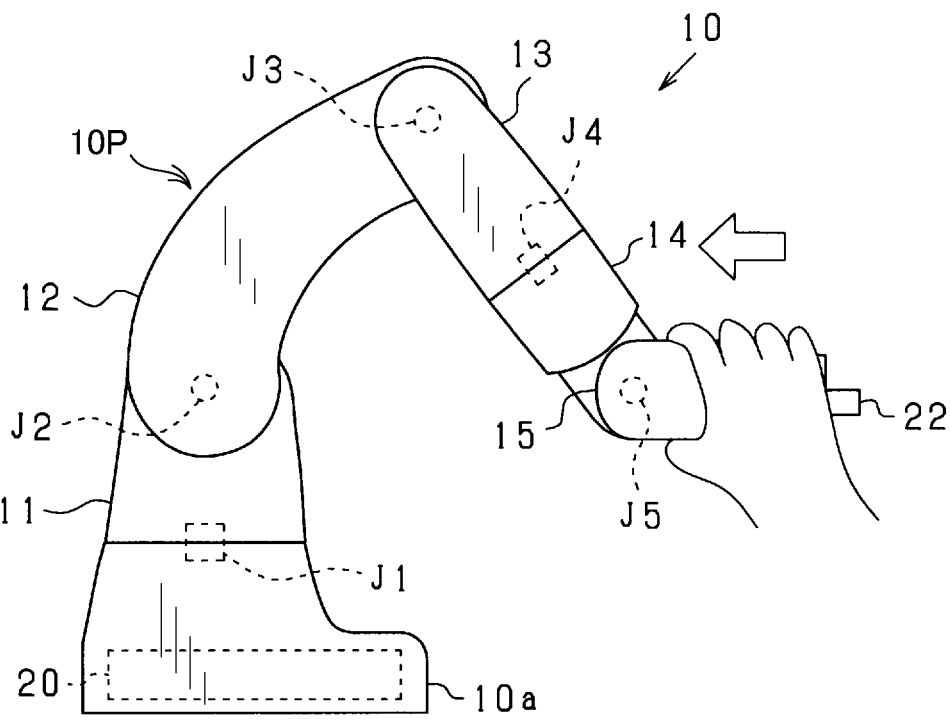
FIG. 2 is an illustration illustrating a user holding a leading arm of the robot.
Figure 3:
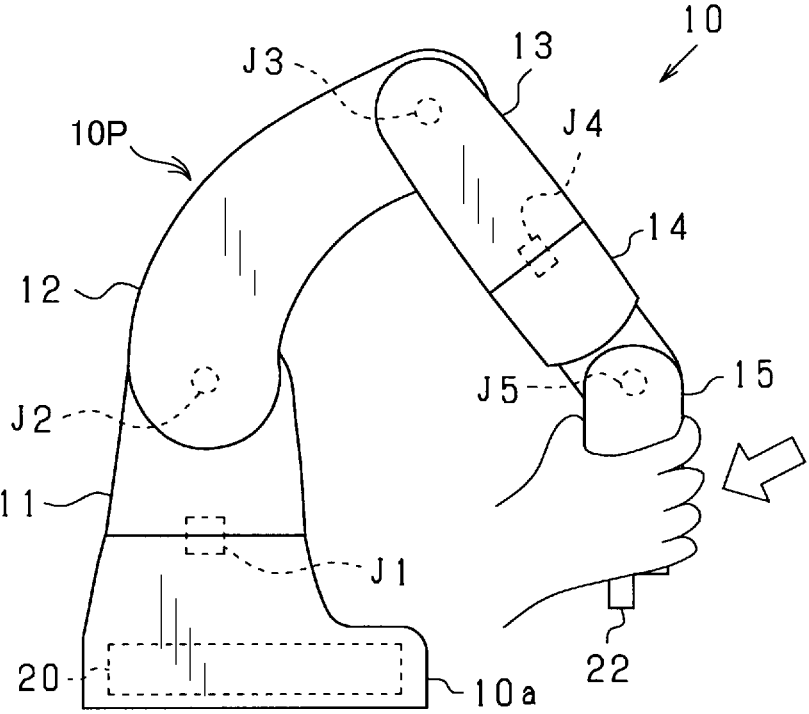
FIG. 3 is an illustration illustrating how the user moves the leading arm of the robot which is held by the user's hand.

When performing direct teaching, the user (operator) presses the start button. The user then grasps the sixth arm 16 with the release button pressed, as shown in FIG. 2. As shown in FIG. 3, the user moves the robot 10 while grasping the sixth arm 16 to move the hand 22 to the position of the workpiece or other object. Direct teaching is then terminated when the user stops pressing the release button and presses the end button.

Here, because the sixth arm 16 has a substantially cylindrical outer surface 16S, it is easy for the user's hand to slip when grasping and moving the sixth arm 16 in direct teaching, requiring the user to grasp the sixth arm 16 with a watchful eye. Therefore, the inventor noticed that it is difficult for the user to move the sixth arm 16 while gazing at the workpiece, etc., and it is difficult to move the hand 22 (sixth arm 16) accurately to the position of the workpiece, etc.

Figure 4:
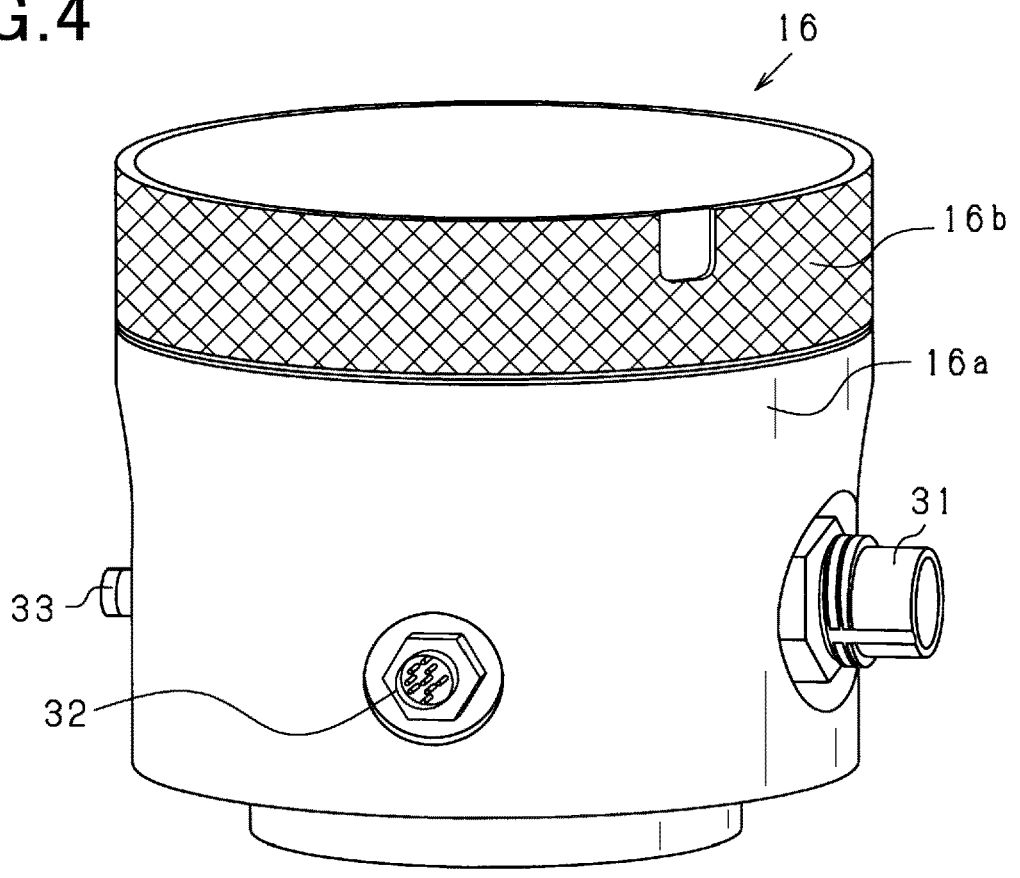
FIG. 4 is an enlarged perspective view showing the sixth arm (the leading arm) of the robot.

In this regard, as shown in FIG. 1, the sixth arm 16 has a knurled section 16b. In detail, as shown in FIG. 4, the cylindrical outer surface 16S (the outer circumference) of the sixth arm 16 has an Ethernet (registered trademark) standard LAN cable connector 31, a lighting cable connector 32, a hand cable connector 33, an air tube connector (not shown), and a sensor cable connector (not shown). A camera cable, for example, is connected to the LAN cable connector 31 (cable connector). Lighting (light) cables are connected to the lighting cable connector 32 (cable connector). The hand cable connector 33 (cable connector) is connected to the cable of the hand 22. A tube that supplies air is connected to the air tube connector (tube connector). The sensor cable connector (cable connector) is connected to the sensor cable.

The knurled portion 16b is formed on the end portion adjacent to the fifth arm 15 on the outer surface 16S of the sixth arm 16. That is, the knurled part 16b (i.e., the predetermined structure for anti-slip operations) is formed only on the end portion of the sixth arm 16 closer to the fifth arm 15 than the cable connectors 31-33 and the air tube connector are. The knurled portion 16b is the end portion of the cylindrical outer surface 16S of the sixth arm 16 that is knurled. Knurling may be done by cutting or by rolling. The knurled area 16b is formed around the entire circumference of the cylindrical outer surface 16S. The knurled area 16b can be implemented as a predetermined pattern of irregularities formed along the circumferential direction CR on the cylindrical outer surface 16S. The surface roughness of the knurled part 16b (the second portion) is rougher than a predetermined-level surface roughness of the part 16a (the first part) with no knurling on the cylindrical outer surface 16S.

Figure 5:
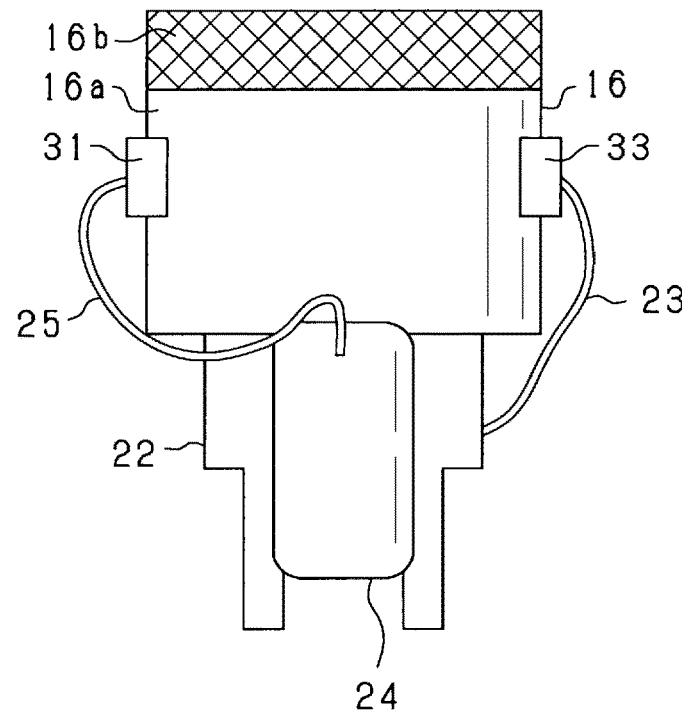
FIG. 5 is a side view showing a hand, a camera and a cable which are attached to the sixth arm (the leading arm) of the robot.

During the direct teaching process, when the user holds or grasps the sixth arm 16, the user may accidentally come into contact with the hand cable 23, LAN cable 25, hand 22, camera 24, etc. (see FIG. 5). In this example, however, the knurled part 16b can indicate a portion of the sixth arm 16 that should be held or grasped by the user for the direct teaching. This implicitly encourages the user to hold or grasp the knurled part 16b on the end portion on the sixth arm 16, where the end portion is adjacent to the fifth arm 15. The user holding or grasping the sixth arm 16 obtains an anti-slip effect which resists to slippery operations, which is thanks to the knurled part 16b. In addition, the user can easily rotate the sixth arm 16 circumferentially. The user can also get a feel of the unevenness from the knurled part 16b.

This embodiment detailed above has the following advantages.

The anti-slip structure (practically, as the knurled part 16b) is formed as a predetermined structure along the circumferential direction CR on the cylindrical outer surface 16S of the sixth arm 16. Therefore, the anti-slip structure prevents the user's hand from slipping when moving the sixth arm 16 in the direct teaching. It is also easier to transmit the force in the direction of rotation of the sixth arm 16, when the direct teaching is performed by holding the sixth arm 16. In addition, in performing the direct teaching, the user can confirm by feel at any circumferential position that the user is holding or grasping the portion of the anti-slip structure without having to gaze at the sixth arm 16. This allows the direct teaching to be performed while looking at the hand 22 and/or workpiece attached to the sixth arm 16. Thus, it is easier for the user to move the sixth arm 16 accurately. Therefore, the teaching can be performed accurately without having to fine-tune the position of the sixth arm 16 by another method after the direct teaching. The result is a significant increase in the direct teaching of the robot efficiency.

The cylindrical outer surface 16S of the sixth arm 16 has a predetermined pattern of unevenness (i.e., the knurled portion 16b) along its circumferential direction CR as a predetermined structure. Therefore, the hand slipping when moving the sixth arm 16 can be inhibited by the unevenness of the predetermined pattern. In addition, as mentioned above, it is easier to transmit force in the direction of rotation of the sixth arm 16. Furthermore, in the direct teaching, the user can confirm by feel at any position in the circumferential direction CR that the user is holding or gripping the uneven part of the predetermined pattern without having to gaze at the sixth arm 16.

The cylindrical outer surface 16S includes the first part (the part 16a with no knurling) of a predetermined roughness and the second part (i.e., the knurled part 16b) as a predetermined structure that is rougher than the predetermined roughness and formed along the circumferential direction CR. Therefore, the second part prevents the user's hand from slipping when moving the sixth arm 16, and the various effects described above can be enjoyed in the same manner in this anti-slip structure.

Moreover, as a preferred embodiment, the predetermined structure (for example, the knurled part 16b) is provided at the end portion of the sixth arm 16 which is adjacent to the fifth arm 15. According to such a configuration, the user will hold or grasp the end portion of the sixth arm 16 at a position adjacent to the fifth arm 15. In other words, holding or grasping near the tip of the sixth arm 16 is reduced.

In the embodiment, the predetermined structure (i.e., the knurled part 16b) is formed only on the part of the sixth arm 16 adjacent to the fifth arm 15, in which the formed part is far from the positions the cable connectors 31-33 and the air tube connector on the sixth arm 16. Therefore, the user will hold or grasp such a formed part of the sixth arm 16, rather than a part of the sixth arm 16 from which the cable connectors 31-33 and the air tube connector extend outwards. This means that accidental contact with the cables 23, 25 or the air tubes can be reduced or inhibited. Therefore, the situation where the cables 23, 25 and/or air tubes are disconnected from the cable connectors 31-33 and/or air tube connector, or cutting of those cables and/or air tubes, can be greatly reduced.

In the embodiment, the predetermined structure (i.e., the knurled part 16b) is provided all around the cylindrical outer surface 16S. Such a configuration prevents the user's hand from slipping in direct teaching, regardless of the circumferential position of the user's hold or grasp of the sixth arm 16. Furthermore, regardless of the circumferential position of the user's hold or grasp of the sixth arm 16, the user can confirm by feel that the user is now holding or grasping the predetermined structural part formed for moving the sixth arm 16 with less slipping operations.

In the embodiment, in addition, the predetermined structure is a knurled portion 16b, whose cylindrical outer surface is knurled. Such a configuration will require only machining to the existing components that make up the sixth arm 16. This makes it easy and inexpensive to install the predetermined structure for anti-slip holding. Furthermore, this configuration can be compared to, for example, a structure with an anti-slip material or the like affixed to the cylindrical outer surface of the sixth arm 16. According to this comparison, there is no risk of anti-slip members, etc. peeling off and no risk of dust generation which will cause due to deterioration or wear of anti-slip members, etc. which are drawbacks to be caused when such members are used as the predetermined structure for anti-slip operations.

The above embodiment may be implemented with the following modifications. In the descriptions of such modifications, the same elements as in the above embodiment will be omitted from the descriptions with the same reference numerals.

The knurled portion 16b (which functions as an anti (or non)-slip structure, unevenness of a predetermined pattern, the second part, a predetermined structure) may be partially provided along the circumferential direction CR on the cylindrical outer surface 16S of sixth arm 16.

Figure 6:
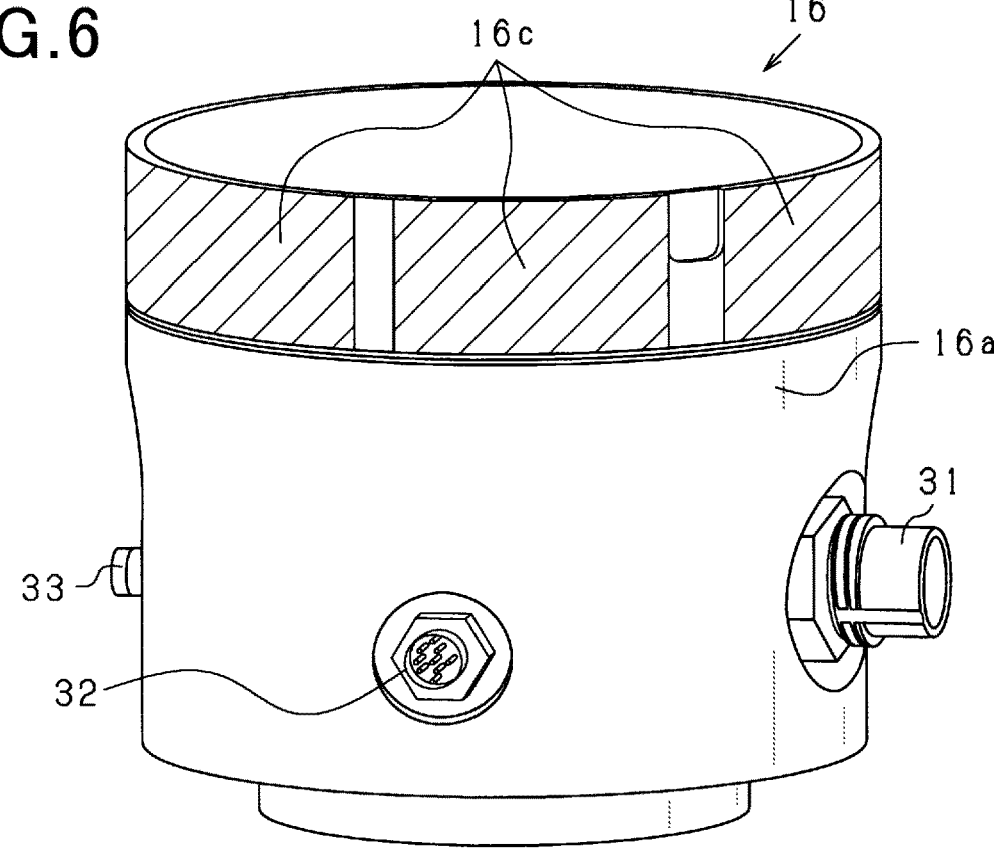
FIG. 6 is an enlarged perspective view showing a modification of the sixth arm.

A modification can be provided, in which, as shown in FIG. 6, the cylindrical outer surface 16S of the sixth arm 16 may be partially sandblasted sections 16*c* along the circumferential direction CR. In this case, the blasted parts 16*c* (which function as an anti-slip structure, a second part, or a predetermined structure and are parts of the cylindrical outer surface 16S of the sixth arm 16 that are blasted partially and located to be in series in the circumferential direction CR. The surface roughness of the blasted parts 16*c* is higher than the surface roughness of the portion 16*a* which is not blasted.

Instead of the knurled part 16*b* and blasting part 16*c*, an etched part can be provided on the circumferential outer surface 16S of the leading arm. The etched part also functions as an anti-slip structure, a second part, or a predetermined structure) and is a partial part from which the cylindrical outer surface 16S of the sixth arm 16 which has been etched. In this modification, the surface roughness of the etched part is rougher than the surface roughness of the portion 16*a* which has not been etched.

The material of the sixth arm 16 is not limited to metal and can be selected according to the above processing and treatment methods.

Figure 7:
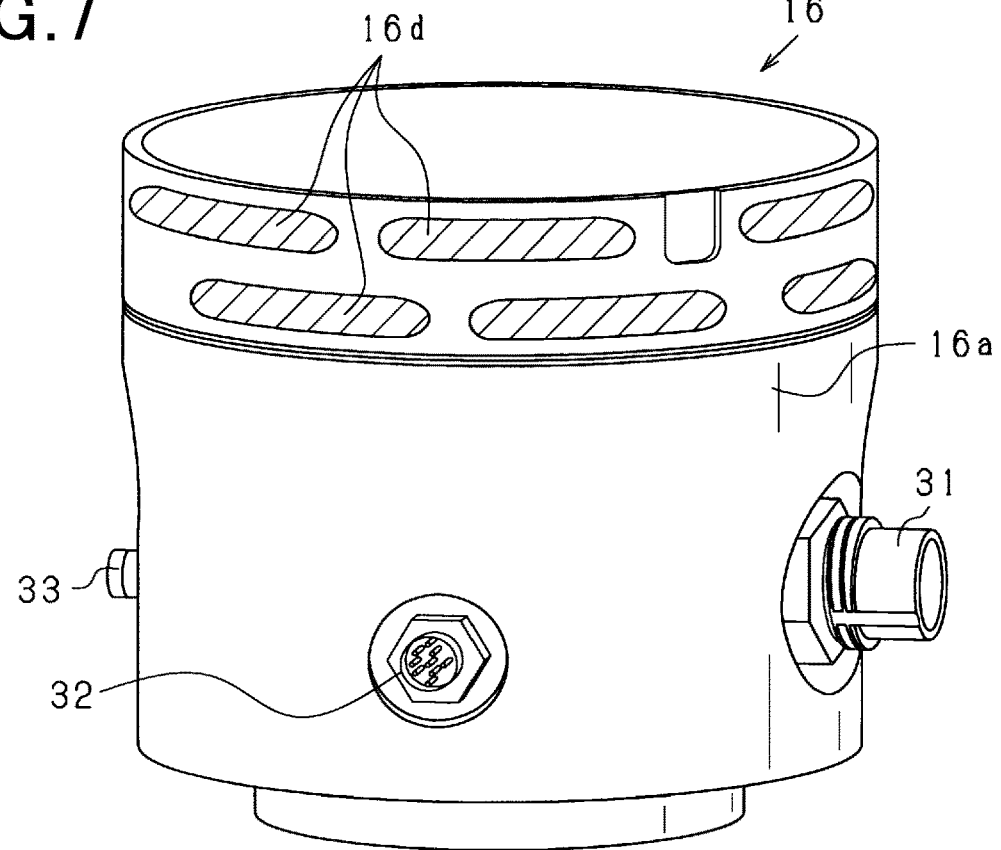
FIG. 7 is another enlarged perspective view showing a modification of the sixth arm.

As shown in FIG. 7, a plurality of rubber members 16*d* can be affixed to the cylindrical outer surface 16S of the sixth arm 16 in one or more rows along the circumferential direction CR. This also allows for the provision of an anti-slip structure (serving as an unevenness of a predetermined pattern, a second part, or a predetermined structure).

Figure 8:
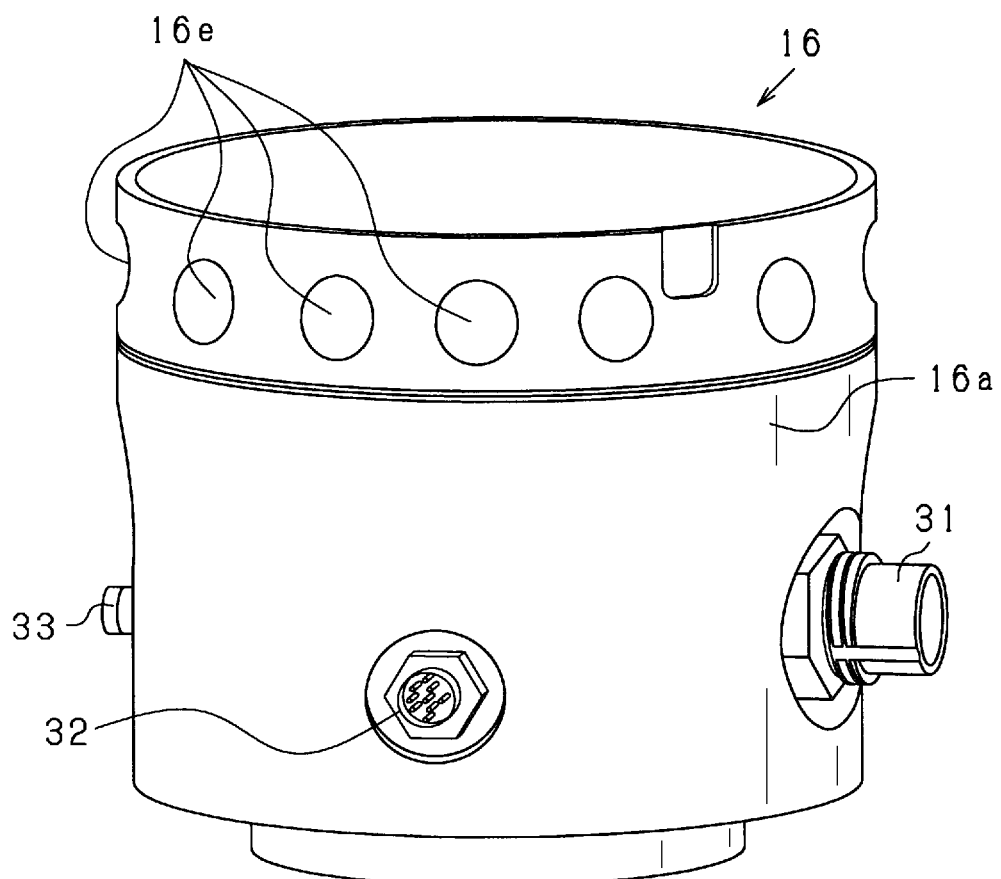
FIG. 8 is another enlarged perspective view showing a modification of the sixth arm.

As shown in FIG. 8, a plurality of recesses 16*e* can be formed at intervals along the circumferential direction CR on the cylindrical outer surface 16S of the sixth arm 16. This can also provide an anti-slip structure (serving as an unevenness of a predetermined pattern, or a predetermined structure).

Figure 9:
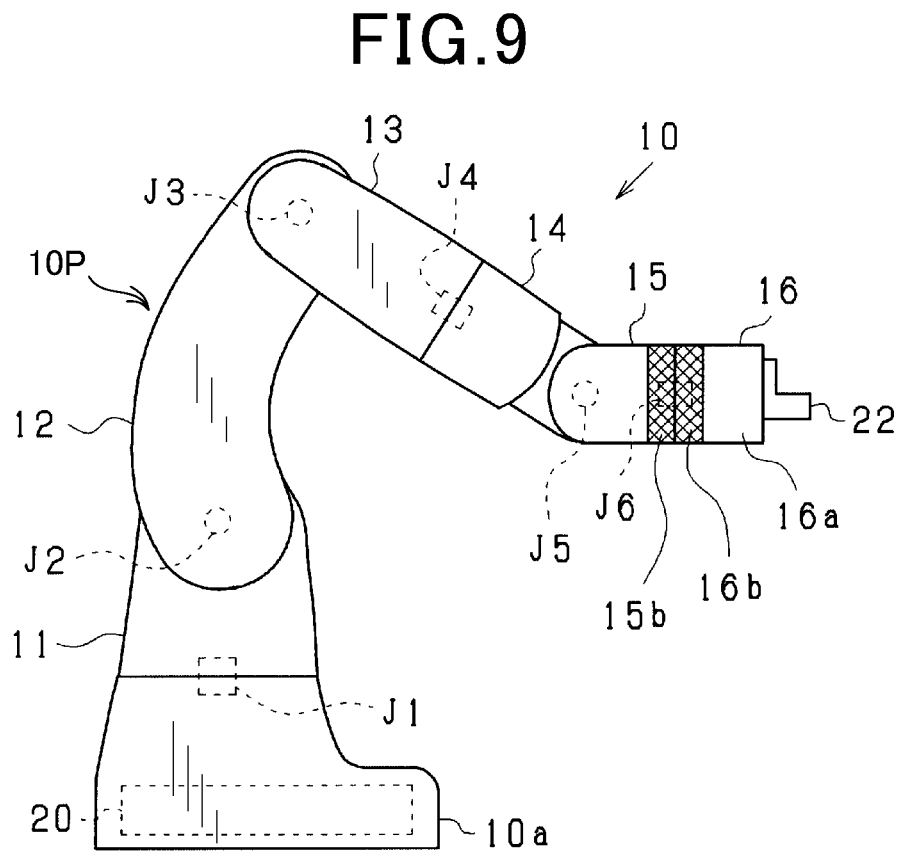

Another modification is illustrated in FIG. 9. As shown, knurled parts 16*b*, 15*b* (i.e., serving as an anti-slip structure, unevenness of predetermined pattern, a second part, or a predetermined structure) may be provided along the circumferential direction CR of the cylindrical outer surface 16S at the end of the fifth arm 15 side to the sixth arm 16 and the end of the sixth arm 16 side to the fifth arm 15, respectively.

This configuration makes it easier for the user to secure the part to be held, even when the robot 10 is small. The entire cylindrical outer surface 16S of the sixth arm 16 may be provided with knurled portions 16*b*. The entire cylindrical outer surface of the fifth arm 15 may be provided with a knurled section 15*b*.

The human-collaborative robot 10 described above is not limited to a vertically articulated industrial robot, but may also be a horizontally articulated industrial robot. The robot 10 is not limited to a 6-axis robot, but can also be a robot with 5 or fewer axes or a robot with 7 or more axes. The robot 10 does not necessarily have to be a human-collaborative robot, as long as direct teaching is performed with the robot, and it can be a large robot that does not collaborate with humans.

The above variations may be implemented in combination.

DESCRIPTION OF PARTIAL REFERENCE NUMERALS

10 . . . robot
15*b* . . . knurled part (anti-slip structure, unevenness of predetermined pattern, second part, predetermined structure)

16 . . . the 6th arm (leading arm)
16*a* . . . part
16*b* . . . Knurled part (anti-slip structure, unevenness of predetermined pattern, second part, predetermined structure)
16*c* . . . Blasted section (anti-slip structure, second part, predetermined structure)
16*d* . . . Rubber member (anti-slip structure, unevenness of predetermined pattern, second part, predetermined structure)
16*e* . . . Recess (anti-slip structure, unevenness of predetermined pattern, predetermined structure)

What is claimed is:

1. An articulated robot, comprising
a base; and
a manipulator having a plurality of arms serially connected with each other and mutually rotatable via an axis arranged between two arms mutually adjacent among the arms, the plurality of arms including a first arm and a leading arm, the first arm rotatably connected to the base via a first axis, the leading arm being manually gripped by an operator who operates the plurality of arms for performing direct teaching with the plurality of arms, the direct teaching being for teaching the robot movements of the plurality of arms,
wherein the leading arm has a cylindrical outer surface having axial and circumferential directions, an anti-slip structure being formed i) partially on the cylindrical outer surface in an axial direction and ii) around the cylindrical outer surface in the circumferential direction,
wherein the cylindrical outer surface is provided with at least one of a cable connector or a tube connector, and
wherein the anti-slip structure is located on only a portion of the leading arm, the leading arm being adjacent to one of the plurality of arms, the one of the plurality of arms being adjacently and rotatably connected to the leading arm via the axis, the portion of the leading arm being adjacent and closer to the one of the plurality of arms than the at least one of the cable connector or the tube connector is.

2. The articulated robot according to claim 1, wherein the anti-slip structure is an unevenness of a predetermined pattern which is formed on the cylindrical outer surface in the circumferential direction.

3. The articulated robot according to claim 1, wherein the anti-slip structure is formed entirely around the cylindrical outer surface.

4. The articulated robot according to claim 1, wherein the anti-slip structure is a knurled part formed by applying knurling to the cylindrical outer surface.

5. The articulated robot according to claim 1, wherein the cylindrical outer surface includes a first part having a predetermined roughness level and a second part functioning as the anti-slip structure, the second part having a roughness larger than the predetermined roughness and being formed partially or entirely in the circumferential direction of the leading arm.

6. The articulated robot according to claim 5, wherein the second part, on which the anti-slip structure is formed, is located on an end of the leading arm in the axis direction, the end being adjacent to the arm adjacently connected to the leading arm.

7. The articulated robot according to claim 6, wherein the second part is located on only a portion of the leading arm, the portion being adjacent to the arm adjacently connected to the leading arm and closer to the adjacent arm than at least one of the cable connector or the tube connector.

8. The articulated robot according to claim 6, wherein the anti-slip structure is formed completely around the cylindrical outer surface.

9. The articulated robot according to claim 5, wherein the second part, on which the anti-slip structure is formed, is located on only a portion of the leading arm, the portion being adjacent to the arm adjacently connected to the leading arm and closer to the adjacent arm than at least one of the cable connector or the tube connector is.

10. The articulated robot according to claim 5, wherein the anti-slip structure is formed entirely around the cylindrical outer surface.

11. The articulated robot according to claim 5, wherein the anti-slip structure is a knurled part formed by applying knurling to the cylindrical outer surface.

* * * * *